(12) United States Patent
Esnault et al.

(10) Patent No.: US 10,955,946 B2
(45) Date of Patent: Mar. 23, 2021

(54) PRESSURE BUTTON FOR A TOUCH SENSITIVE SURFACE, PHYSICAL INTERFACE AND PROTECTION ELEMENT USING SAME

(71) Applicant: ORANGE, Paris (FR)

(72) Inventors: Regis Esnault, Chatillon (FR); Christian Gregoire, Chatillon (FR); Nicolas Pellen, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/494,091

(22) PCT Filed: Mar. 14, 2018

(86) PCT No.: PCT/FR2018/050602
§ 371 (c)(1),
(2) Date: Sep. 13, 2019

(87) PCT Pub. No.: WO2018/167423
PCT Pub. Date: Sep. 20, 2018

(65) Prior Publication Data
US 2020/0133408 A1 Apr. 30, 2020

(30) Foreign Application Priority Data

Mar. 14, 2017 (FR) ..................................... 1752079

(51) Int. Cl.
*G06F 3/039* (2013.01)
*G06F 3/01* (2006.01)
(Continued)

(52) U.S. Cl.
CPC ............ *G06F 3/0393* (2019.05); *G06F 3/016* (2013.01); *G06F 3/0219* (2013.01); *G06F 3/041* (2013.01);
(Continued)

(58) Field of Classification Search
CPC ...... G06F 3/0393; G06F 3/016; G06F 3/0219; G06F 3/041; G06F 3/039; G06F 3/044;
(Continued)

(56) References Cited

U.S. PATENT DOCUMENTS

| 8,274,479 B2* | 9/2012 | Prest ..................... G06F 3/0338 |
| | | 345/169 |
| 8,462,133 B2* | 6/2013 | Lynch .................. G06F 3/0202 |
| | | 345/173 |

(Continued)

FOREIGN PATENT DOCUMENTS

| DE | 202014000752 U1 | 2/2014 |
| EP | 2187290 A1 | 5/2010 |

OTHER PUBLICATIONS

International Search Report dated Sep. 7, 2018 for corresponding International Application No. PCT/FR2018/050602, filed Mar. 14, 2018.

(Continued)

*Primary Examiner* — Darlene M Ritchie
(74) *Attorney, Agent, or Firm* — David D. Brush; Westman, Champlin & Koehler, P.A.

(57) ABSTRACT

A pressure button for a touch-sensitive surface, a physical interface for a touch-sensitive surface, and a protection element for a touch-sensitive surface, in particular a touch screen of a terminal such as a smart phone or a tablet. The pressure button has a contact switch passing through the pressure button, from the upper surface to the lower surface of said pressure button. The contact switch is suitable for allowing interaction with a terminal via a touch-sensitive surface when the pressure button is positioned on the latter. The user can thus interact with the terminal by using a pressure button without requiring connectors for this interface.

8 Claims, 4 Drawing Sheets

(51) Int. Cl.
*G06F 3/02* (2006.01)
*G06F 3/041* (2006.01)
*H01H 13/12* (2006.01)
*H01H 13/04* (2006.01)
*H04M 1/72412* (2021.01)
*H04M 1/72409* (2021.01)
*H04M 1/72427* (2021.01)

(52) U.S. Cl.
CPC ............ *H01H 13/04* (2013.01); *H01H 13/12* (2013.01); *H04M 1/72409* (2021.01); *H04M 1/72412* (2021.01); *H04M 1/72427* (2021.01)

(58) Field of Classification Search
CPC ............ G06F 3/0338; H04M 1/72527; H04M 1/72544; H04M 1/7253; H01H 13/00; H01H 13/04; H01H 13/06; H01H 13/063; H01H 13/08; H01H 13/12; H01H 13/15
See application file for complete search history.

(56) References Cited

U.S. PATENT DOCUMENTS

| | | | |
|---|---|---|---|
| 8,482,540 B1 | 7/2013 | Reeves et al. | |
| 9,170,658 B2 * | 10/2015 | Quek | G06F 3/033 |
| 9,460,029 B2 * | 10/2016 | Shaw | G05B 11/01 |
| 9,638,591 B1 * | 5/2017 | Sarcia | G01L 1/246 |
| 10,437,411 B2 * | 10/2019 | Helmes | G06F 1/1632 |
| 2002/0054030 A1 * | 5/2002 | Murphy | G06F 3/04886 |
| | | | 345/173 |
| 2003/0235452 A1 * | 12/2003 | Kraus | B41J 5/102 |
| | | | 400/472 |
| 2005/0088417 A1 * | 4/2005 | Mulligan | G06F 3/04886 |
| | | | 345/173 |
| 2006/0181521 A1 * | 8/2006 | Perreault | G06F 1/1613 |
| | | | 345/173 |
| 2006/0256090 A1 | 11/2006 | Huppi | |
| 2010/0026635 A1 * | 2/2010 | Dimitrov | G06F 3/046 |
| | | | 345/173 |
| 2011/0248838 A1 | 10/2011 | Krahenbuhl et al. | |
| 2013/0118881 A1 * | 5/2013 | Hakimiyan | G06F 3/033 |
| | | | 200/530 |
| 2015/0363006 A1 * | 12/2015 | Hsu | G06F 3/04886 |
| | | | 345/168 |
| 2016/0062482 A1 * | 3/2016 | Nietvelt | G06F 3/039 |
| | | | 345/173 |
| 2017/0168634 A1 | 6/2017 | Depold | |
| 2018/0164938 A1 * | 6/2018 | Li | H03K 17/97 |
| 2019/0064885 A1 * | 2/2019 | Paik | H05K 5/0247 |
| 2019/0102969 A1 * | 4/2019 | Lapalme | G06F 3/044 |

OTHER PUBLICATIONS

Written Opinion of the International Searching Authority dated Sep. 7, 2018 for corresponding International Application No. PCT/FR2018/050602, filed Mar. 14, 2018.

English translation of the Written Opinion of the International Searching Authority dated Sep. 21, 2018 for corresponding International Application No. PCT/FR2018/050602, filed Mar. 14, 2018.

* cited by examiner

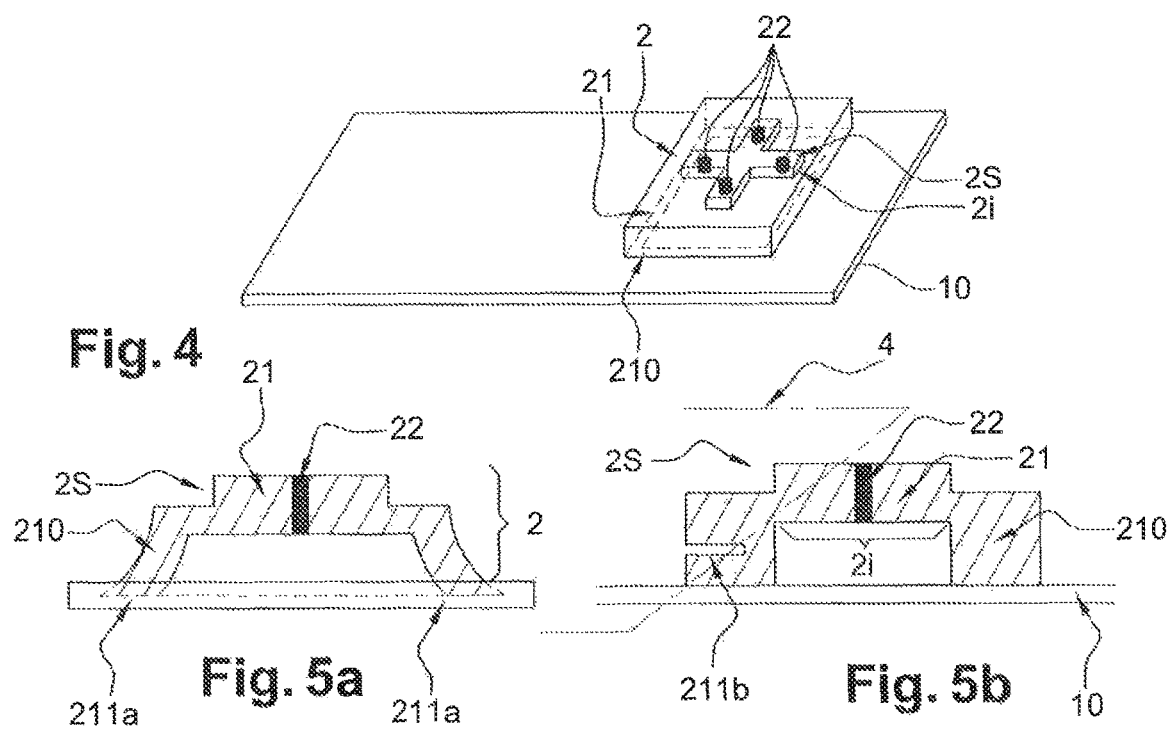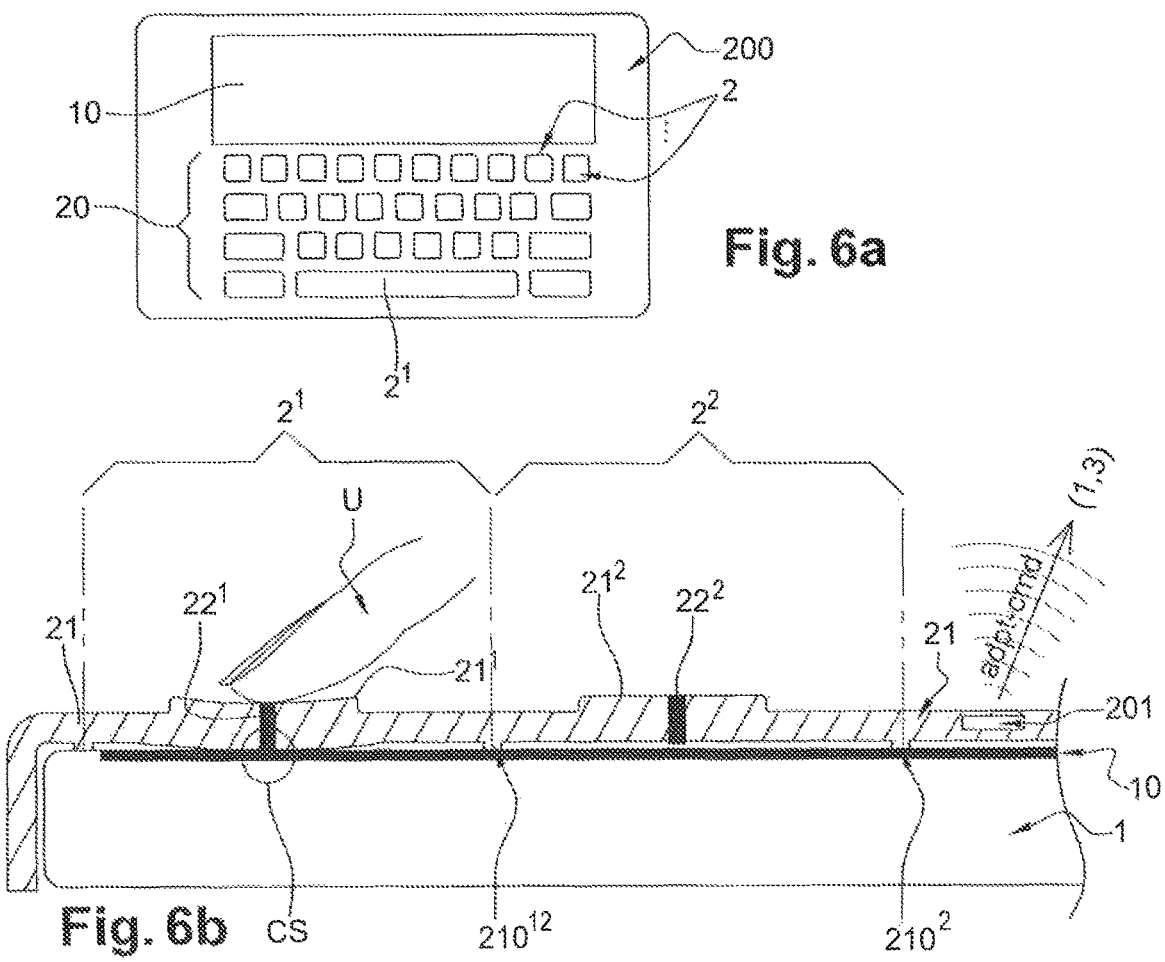

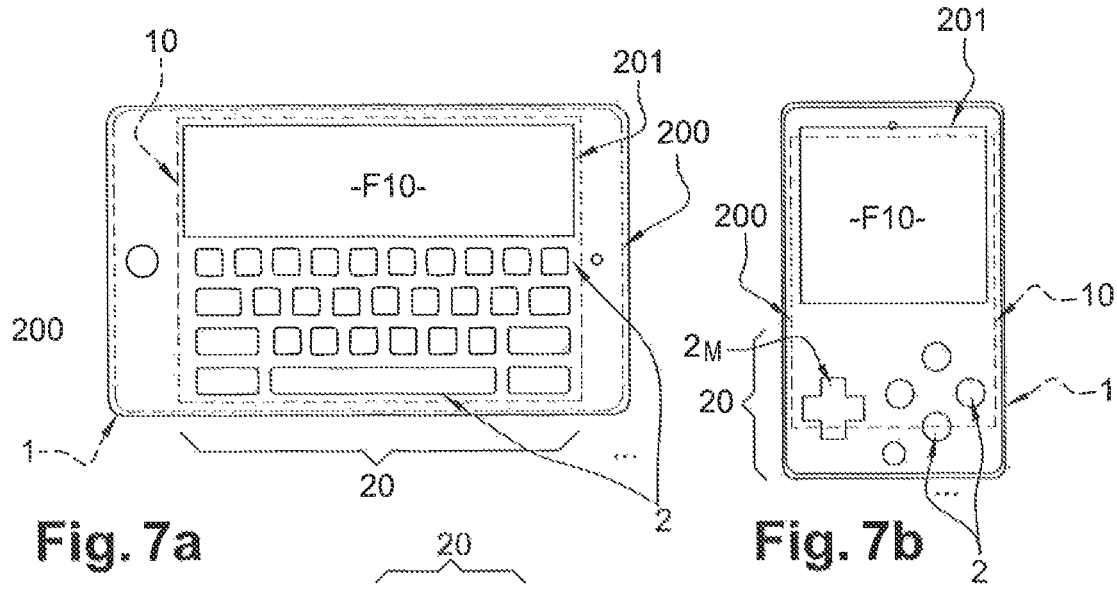
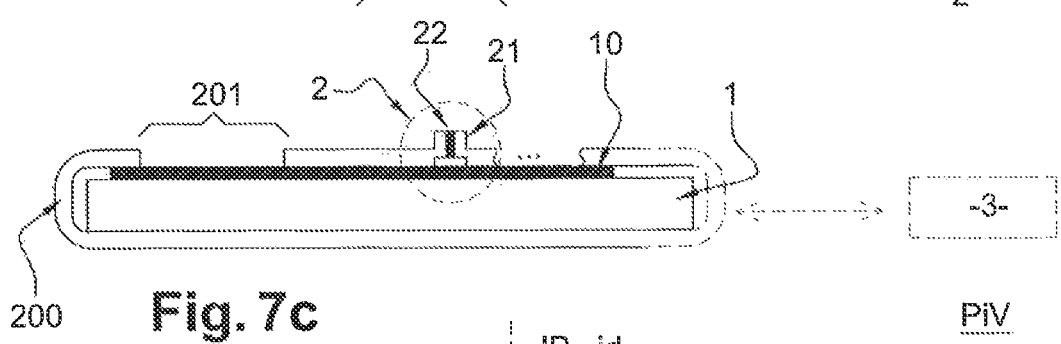
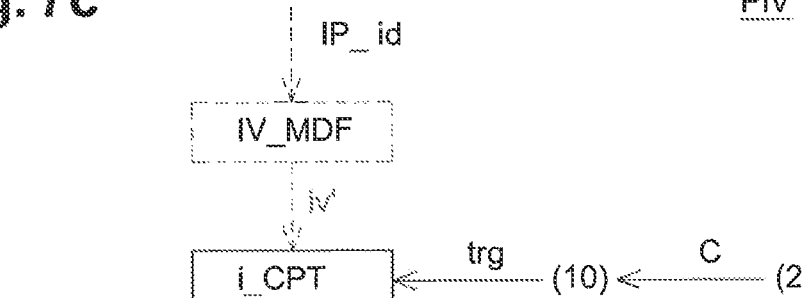
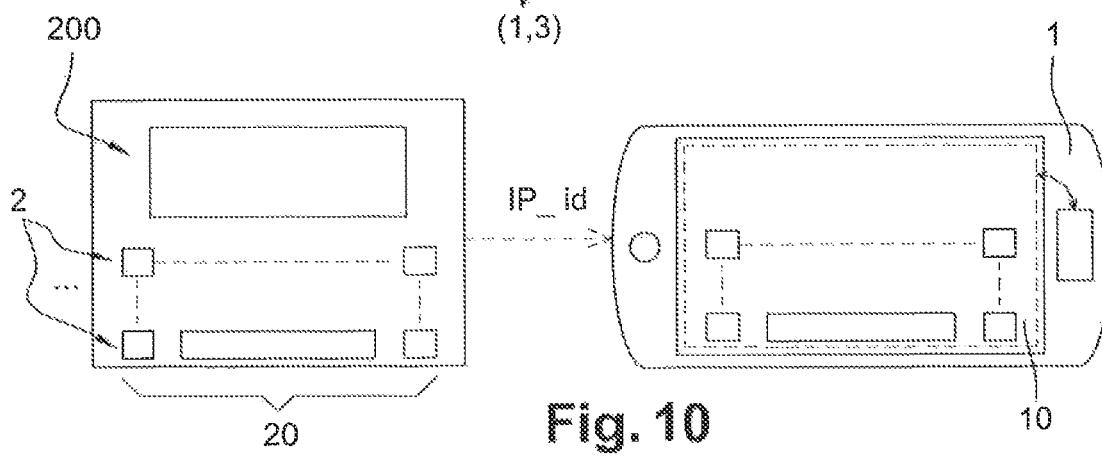

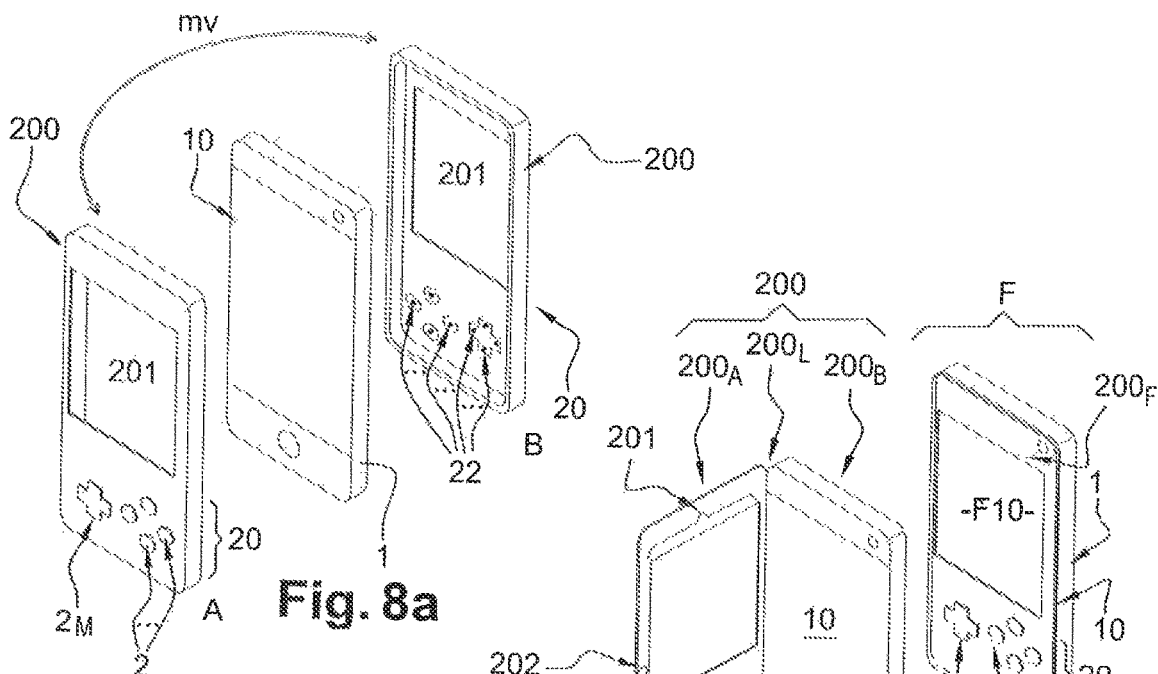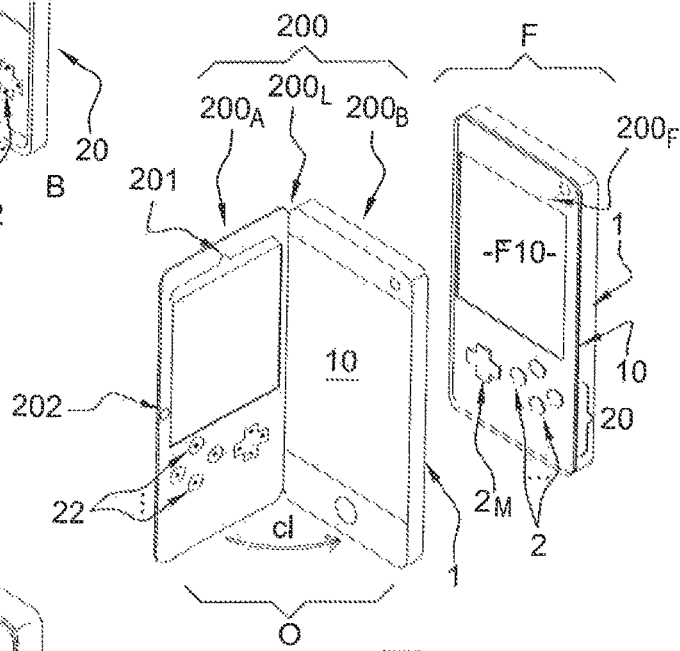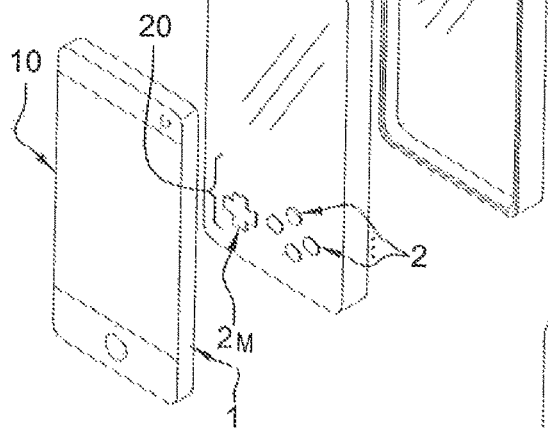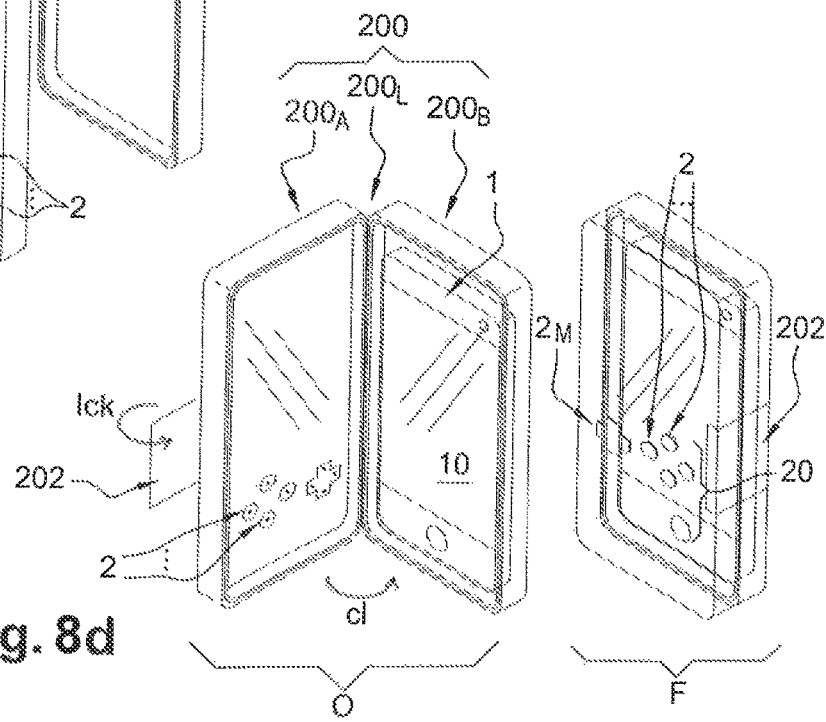

PRESSURE BUTTON FOR A TOUCH SENSITIVE SURFACE, PHYSICAL INTERFACE AND PROTECTION ELEMENT USING SAME

CROSS-REFERENCE TO RELATED APPLICATIONS

This Application is a Section 371 National Stage Application of International Application No. PCT/FR2018/050602, filed Mar. 14, 2018, the content of which is incorporated herein by reference in its entirety, and published as WO 2018/167423 on Sep. 20, 2018, not in English.

FIELD OF THE DISCLOSURE

The invention relates to a pushbutton for a touch-sensitive surface, to a physical interface for a touch-sensitive surface, and to a protector for a touch-sensitive surface, in particular a touchscreen of a terminal, such as a smartphone or a tablet.

BACKGROUND OF THE DISCLOSURE

The use of touch-sensitive surfaces, in particular of terminals equipped with touchscreens, such as tablets and smartphones, has become widespread.

These touch interfaces make certain interactions with the terminal less simple, in particular input interactions.

Furthermore, the lack of force feedback, that is to say resistance to the action of the user, is also a drawback of touch-sensitive surfaces. This resistance may enhance the experience offered by the terminal when an application is implemented.

In addition, force feedback may also make the interaction with the terminal more comfortable for the client. Specifically, the touch-sensitive surface is a hard surface that leads to an impact on the joints, in contrast to the keys of a keypad or of a gamepad or to the joystick of a gamepad, which are more flexible to use for the joints of the hand.

For this reason, hybrid terminals between the portable computer and the tablet have been designed, independent interfaces that are connected to the terminal, such as keypads for tablets or gamepads for smartphones, are provided in order to facilitate the use of some applications implemented by these terminals.

SUMMARY

One of the aims of the present invention is to provide improvements with respect to the prior art.

One subject of the invention is a physical pushbutton for a touch-sensitive surface. The pushbutton includes a contactor passing through the pushbutton from the upper surface of the pushbutton to the lower surface of the pushbutton, the contactor being able to allow an interaction with a terminal by way of a touch-sensitive surface when the pushbutton is positioned on the touch-sensitive surface.

The user is thus able to interact with the terminal by way of a pushbutton without requiring a connection system for this interface. The risks linked to the fragility of the connection systems or to the pairing of a physical interface with the terminal are thus reduced.

Advantageously, the pushbutton includes:
an upper surface allowing a finger of a user to exert a pressure on the pushbutton,
a lower surface positioned above the touch-sensitive surface, able to be brought into contact with the touch-sensitive surface when a pressure is exerted on the pushbutton, and
a contactor passing through the pushbutton from the upper surface to the lower surface of the pushbutton, the contactor being positioned:
on the upper surface so as to be in contact with the finger of the user exerting a pressure on the upper surface of the pushbutton, and
on the lower surface so as to be in contact with the touch-sensitive surface when the lower surface is brought into contact with the touch-sensitive surface.

Thus, the pushbutton relays the contact normally exerted by the finger directly on the touch-sensitive surface in order to interact with the terminal via the touch-sensitive surface.

Advantageously, the pushbutton includes a plurality of positioned contactors, each contactor having a separate position on the upper surface and the lower surface of the pushbutton, allowing an interaction with a separate surface of the touch-sensitive surface.

The pushbutton may thus serve as a directional pad, as a scrollbar, etc.

Advantageously, the pushbutton includes fasteners for fastening the pushbutton in a position in relation to the touch-sensitive surface.

The positioning of the pushbutton will thus be stable in relation to the touch-sensitive surface regardless of the position thereof. This may be beneficial for some applications, in particular reading content, in which the button will be positioned at a specific position so as to allow the reading of the content to be activated or this reading to be paused.

Advantageously, the pushbutton is formed of at least one flexible material.

The flexible material thus makes it possible to keep the contactor at a distance for as long as a pressure is not exerted, and allows the contactor to come into contact with the touch-sensitive surface when a pressure is exerted on the pushbutton.

Advantageously, the contactor is formed of a conductive material.

The contactor thus relays the conductivity of the finger normally performed during direct contact on the touch-sensitive surface in order to interact with the terminal.

One subject of the invention is also a physical interface for a touch-sensitive surface including at least one physical pushbutton for a touch-sensitive surface, the pushbutton including a contactor passing through the pushbutton from the upper surface of the pushbutton to the lower surface of the pushbutton, the contactor being able to allow an interaction with a terminal by way of a touch-sensitive surface when the pushbutton is positioned on the touch-sensitive surface.

Thus, a keypad, a number pad and/or directional pad, or a gamepad allow the user to interact with the terminal by way of this physical interface without requiring a connection system for this physical interface, while at the same time reducing the risks linked to the fragility of the connection systems or to the pairing of a physical interface with the terminal.

Advantageously, the physical interface includes a provider of an identifier of the physical interface to the terminal, such that the identifier of the physical interface allows the terminal to modify a virtual interface with the terminal, the modification depending on the identifier of the physical interface.

A single physical interface may thus be able to be used by a plurality of separate applications implemented by the terminal. This avoids each application developing its own proprietary interface and the risks of errors of using a physical interface inappropriate for an application implemented by the terminal (incorrect interaction position in relation to the touch-sensitive surface, incorrect indication of the type of interaction on the physical interface, etc.).

Advantageously, the identifier provider consists of at least one of the following devices:

a symbol affixed to the physical interface;

a transmission circuit having a memory containing the identifier of the physical interface, the circuit being a contact-based or contactless transmission circuit.

The virtual interface implemented by the terminal in association with the touch-sensitive surface is thus automatically adapted to the physical interface used to interact with the terminal via this touch-sensitive surface.

Advantageously, the identifier provider includes a controller, the identifier provider transmitting a virtual interface adaptation command generated by the controller, the adaptation command triggering the modification of the virtual interface depending on the identifier of the physical interface contained in the adaptation command.

Thus, it is the physical interface that controls the adaptation of the virtual interface of the terminal, avoiding the terminal implementing a detection of the physical interface triggering the adaptation.

One subject of the invention is also a protector for a touch-sensitive surface covering at least part of a touch-sensitive surface able to allow an interaction with a terminal, the frontal part of the protector including at least one pushbutton for a touch-sensitive surface or a physical interface for a touch-sensitive surface including at least one pushbutton for a touch-sensitive surface, the pushbutton including a contactor passing through the pushbutton from the upper surface of the pushbutton to the lower surface of the pushbutton, the contactor being able to allow an interaction with a terminal by way of a touch-sensitive surface when the pushbutton is positioned on the touch-sensitive surface.

The physical interface thus has not only a role in the interaction of the user with the terminal: usage comfort and/or force feedback and/or ease of interaction while at the same time limiting the risks of connection problems, but also a protective role, in particular protection against impacts.

One subject of the invention is also a virtual interface method for a terminal, including capturing an interaction with the terminal, by way of a contactor passing through a pushbutton for a touch-sensitive surface from the upper surface of the pushbutton to the lower surface of the pushbutton, by way of a touch-sensitive surface when the pushbutton is positioned on the touch-sensitive surface.

Advantageously, the virtual interface method includes modifying the virtual interface depending on an identifier of a physical interface for a touch-sensitive surface, the physical interface including at least one pushbutton for a touch-sensitive surface and a provider of the identifier of the physical interface to the terminal.

The virtual interface is thus adapted to the physical interface, allowing optimization of the interaction with the terminal by way of a physical interface regardless of the processing operation or the application implemented by the terminal.

Advantageously, according to one implementation of the invention, the various steps of the method according to the invention are implemented by software or a computer program, this software comprising software instructions intended to be executed by a data processor of a terminal with which a user interacts by way of a touch-sensitive surface and being designed to command the execution of the various steps of this method.

The invention therefore also targets a program comprising program code instructions for executing the steps of the virtual interface method according to the invention when said program is executed by a processor.

This program may use any programming language, and be in the form of source code, object code, or intermediate code between source code and object code, such as in a partially compiled form, or in any other desirable form.

One subject of the invention is also a terminal including a virtual interface able to capture an interaction with the terminal, by way of a contactor passing through a pushbutton for a touch-sensitive surface from the upper surface of the pushbutton to the lower surface of the pushbutton, by way of a touch-sensitive surface when the pushbutton is positioned on the touch-sensitive surface.

BRIEF DESCRIPTION OF THE DRAWINGS

The features and advantages of the invention will become more clearly apparent upon reading the description, given by way of example, and the attached figures, in which:

FIG. 4 shows a simplified three-dimensional diagram of a multi-contactor pushbutton according to the invention;

FIGS. 5a and 5b show simplified diagrams of separate embodiments of the fastenings of a pushbutton according to the invention, respectively through suction or through interaction with a protector of the touch-sensitive surface;

FIGS. 6a and 6b show simplified diagrams of a physical interface according to the invention, respectively an overall view and a cross-sectional view of part of the physical interface;

FIGS. 7a, 7a and 7c show simplified diagrams of protectors according to the invention, respectively an overall view of a protector incorporating a keypad, an overall view of a protector incorporating a gamepad, and a cross-sectional view;

FIGS. 8a, 8b, 8c and 8d show simplified diagrams of various exemplary embodiments of a protector according to the invention, FIG. 9 shows a simplified diagram of a virtual interface method according to the invention;

FIG. 10 shows a diagram of a terminal according to the invention.

DETAILED DESCRIPTION OF ILLUSTRATIVE EMBODIMENTS

Figures 1A, 1B:
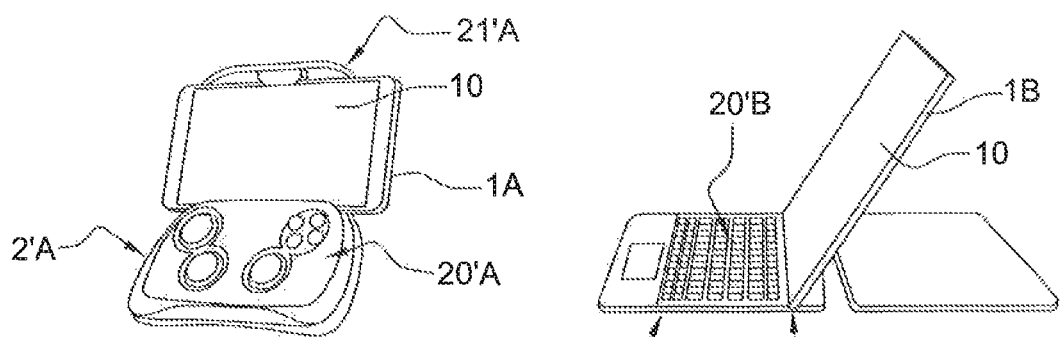
FIGS. 1a and 1b show physical interfaces for terminals having a touchscreen, respectively a gamepad for a smartphone and a keypad for a tablet, according to the prior art.

FIGS. 1a and 1b illustrate physical interfaces for terminals having a touchscreen according to the prior art.

In these figures, the terminal 1A, 1B includes a touchscreen 10. To interact with this terminal 1A, 1B, a user uses for example at least one of his fingers to touch the touchscreen 10 on a zone of the screen displaying a command of a virtual interface implemented by the terminal 1A, 1B.

The prior art proposes, in order to facilitate the interaction of users with these touchscreen terminals 1A, 1B, to connect them physically (microUSB, USB, etc.) or through radio pairing (Bluetooth, Wi-Fi, etc.) to a physical interface 20'A, 20'B. The physical interface 20'A, 20'B is possibly implemented on a support device TA, TB, making it possible in particular to keep the terminal 1A, 1B in a predetermined position, thus providing convenience of viewing and reading for the user.

FIG. 1a shows a gamepad 20'A for a smartphone 1A. Plus, FIG. 1b shows a keypad 20'B for a tablet 1B.

Figure 2A:
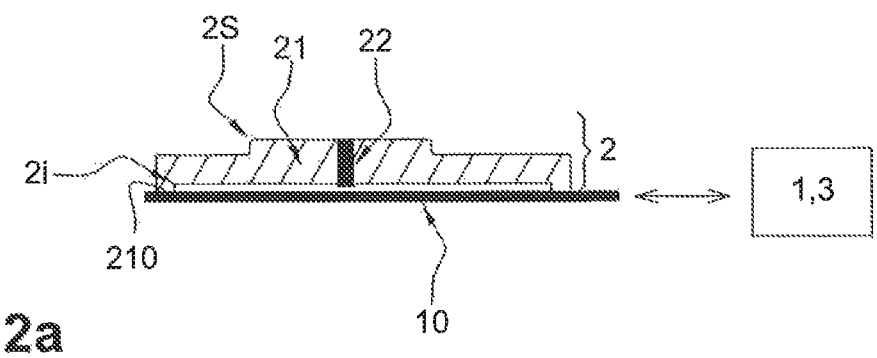
FIGS. 2a and 2b show simplified diagrams, seen in cross section, of a pushbutton in a first embodiment of the invention, respectively when the pushbutton is at rest and when the pushbutton is under pressure, in particular from the finger of a user.
Figure 2B:
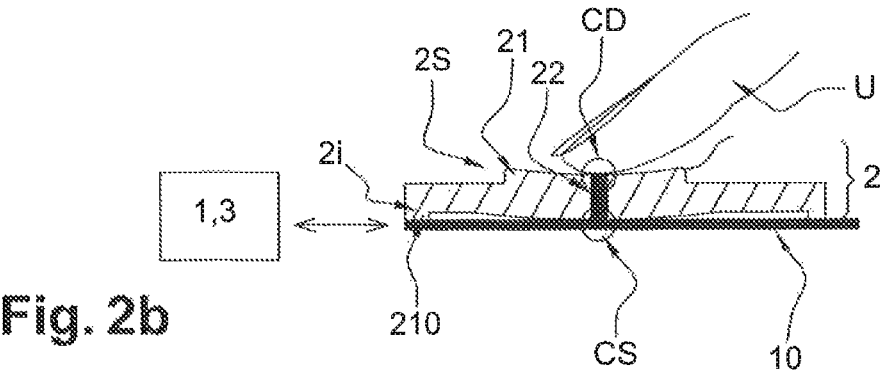
Figure 3:
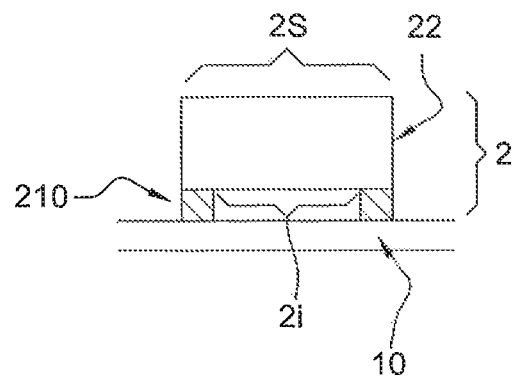
FIG. 3 shows a simplified diagram, seen in cross section, of a pushbutton in a second embodiment of the invention.

FIGS. 2a and 2b illustrate simplified diagrams, seen in cross section, of a pushbutton for a touch-sensitive surface in a first embodiment of the invention. FIG. 3 illustrates a pushbutton in a second embodiment.

These three figures show a physical pushbutton 2 for a touch-sensitive surface, such as a touch-sensitive surface 10 of a graphical tablet 1 connected to a terminal 3 or a touchscreen 10 of a terminal 1, which is able to allow an interaction with a terminal 1, 3 by way of a touch-sensitive surface 10 when the pushbutton 2 is positioned on the touch-sensitive surface 10.

The pushbutton 2 includes a contactor 22 passing through the pushbutton 2 from the upper surface 2S of the pushbutton to the lower surface 2I of the pushbutton, as illustrated in particular by FIGS. 2a and 2b.

A user U is thus able to interact with the terminal 1, 3 not through direct contact with the touch-sensitive surface 10, but at least one pushbutton 2 without requiring a connection system for this additional interface (including the pushbutton). The risks linked to the fragility of the connection systems or to the pairing of a physical interface with the terminal are thus reduced.

Such a pushbutton 2 may be placed by the user U in a relative position with respect to the touch-sensitive surface 10 at a time in order to command a given interaction with the terminal 3. When the interaction has ended, the pushbutton 2 is able to remain in the same position in relation to the touch-sensitive surface 10, making it possible to again subsequently command the same interaction while thus limiting the risk of an interaction error. Specifically, the use of the finger of the user or of a stylus to make contact with the touch-sensitive surface 10 for triggering an interaction with the terminal 3 prevents this position from being maintained: the user using his hand for other actions (the stylus will therefore have to be put down).

In particular, the pushbutton 2 includes:
an upper surface 2S allowing a finger of a user U to exert a pressure on the pushbutton 2,
a lower surface 2I positioned above the touch-sensitive surface 10, able to be brought into contact with the touch-sensitive surface 10 when a pressure is exerted on the pushbutton 2, and
a contactor 22 passing through the pushbutton 2 from the upper surface 2S to the lower surface 2I of the pushbutton 2, the contactor 22 being positioned:
on the upper surface 2S so as to be in contact CD with the finger of the user U exerting a pressure on the upper surface 2S of the pushbutton 2, and
on the lower surface 2I so as to be in contact CS with the touch-sensitive surface 10 when the lower surface 2I is brought into contact with the touch-sensitive surface 10.

In particular, the pushbutton 2 is formed of at least one flexible material 21.

In particular, the contactor 22 is formed of a conductive material. The conductive material is in particular a flexible material, such as a polymer or elastomer, or having physical features that are similar, in particular in terms of flexibility.

In particular, the pushbutton 2 may include a varying proportion of flexible material 21 and of conductive material 22, from mostly made from non-conductive flexible material to mostly made from conductive material 22. For example, only the perimeter of the pushbutton 2 in continuous contact with the touch-sensitive surface 10 will be made from non-conductive flexible material 21, the rest of the pushbutton being made from conductive material 22. The entire pushbutton will be formed of a non-conductive flexible material 21 apart from a wire, a strip, a rod made from conductive material 22, etc. at the center of the pushbutton 2 or over two, four, etc. points of the pushbutton 2 in the case of a multi-contactor pushbutton.

In particular, the pushbutton 2 includes at least one spacer 210 placed underneath the lower surface of the pushbutton. The spacer 210 is always separate from the contactor 22.

The spacer 210 is able to isolate the contactor 22 from the touch-sensitive surface 10 at least when the pushbutton 2 is at rest, in particular by keeping the contactor 22 at a distance from the touch-sensitive surface 10. The pushbutton 2 at rest thus does not trigger an interaction with the terminal 1, 3 via the touch-sensitive surface 10.

The pushbutton 2 includes either a single spacer at the outer periphery of the pushbutton 2 (that is to say encircling the pushbutton 2) or a plurality of spacers placed at a plurality of positions of this outer periphery of the pushbutton 2.

The touch-sensitive surface is in particular resistive or capacitive. For example, nowadays, touchscreens on board vehicles or that are used in certain professional fields are generally resistive screens, whereas those used by the wider public are more often capacitive screens.

In the case of capacitive touch-sensitive surfaces, the pushbutton 2 will include a contactor 22 made from conductive material so as to allow an interaction with the terminal via the touch-sensitive surface by way of the pushbutton 2. On the other hand, in the case of resistive touch-sensitive surfaces, the composition of the contactor 22 of the pushbutton 2 does not influence the establishment of the interaction with the terminal via the touch-sensitive surface by way of the pushbutton 2.

FIG. 2a shows the pushbutton 2 when it is at rest.

In the example of FIG. 2a, the pushbutton 2 is at rest. It is formed of a flexible material 21 from its upper surface 2S to its lower surface 2I, except for a central cylinder made from conductive material 22 forming a contactor. The lower surface 2I on which the contactor 22 is exposed is remote from the touch-sensitive surface 10 for interacting with the terminal 1, 3.

In particular, the pushbutton 2 includes spacers 210 placed at the periphery of the pushbutton 2 underneath its lower surface 2I. The spacers are in particular made from flexible material.

FIG. 2b shows the pushbutton when it is under pressure, in particular from the finger of a user.

The pushbutton 2 illustrated by FIG. 2a is put under pressure by the user U wishing to interact with the terminal 1, 3.

In the example of FIG. 2b, the pushbutton 2 deforms under the pressure, such that the contactor 22 touches the touch-sensitive surface 10. This deformation is possible in particular due to one or more parameters of the pushbutton 2:

the degree of flexibility of the flexible material 21 of the pushbutton 2 from its upper surface 2S to its lower surface 2I;

the dimensions of the surface 2S;

the composition of the spacers 210 (in particular made from a flexible material, such as that used in the rest of the pushbutton 2);

the dimensions of the spacers;

the degree of flexibility of the contactor 22;

the dimensions of the contactor 22.

In the example of FIG. 2a, the deformation is linked to the flexible material 21 used in the composition of the majority of the pushbutton 2, including in the spacers 210, and to the large dimension of the lower surface 2I between the spacers 210.

The contactor 22 is then in contact CD with the finger of the user U and the touch-sensitive surface 10 transmitting the interaction from the finger to the touch-sensitive surface. If the contactor 22 is made from conductive material, as illustrated in FIG. 2b, the transmission of the interaction from the finger of the user U consists in transmitting the conductivity from the finger to the touch-sensitive surface triggering the interaction with the terminal 1, 3.

Regardless of the embodiment, the contactor 22 does not occupy the entire upper surface of the pushbutton or the entire lower surface of the pushbutton. The pushbutton 2 then includes two separate parts, one of which constitutes the contactor 22. In other words, the pushbutton includes a first volume 21 and a second volume 22, the first and the second volume being separate, the second volume constituting the contactor 22.

In addition, the contactor 22 is in particular formed by a cylindrical rod, having a cubic profile, etc., or a specific three-dimensional zone in the pushbutton. This contactor is in particular formed by a material that allows, upon contact with an in particular resistive or conductive touch-sensitive surface, an interaction equivalent to that due to the contact of a finger, such as a conductive or resistive material: for example metals, conductive plastics, conductivity/resistivity-doped materials, specific nanostructures, such as metal, conductive and/or resistive ones, integrated into the contactor 22.

FIG. 3 illustrates a simplified diagram, seen in cross section, of a pushbutton in a second embodiment of the invention.

In this second embodiment, a predefined passing-through zone (not illustrated) of the pushbutton (not forming the entire pushbutton 2) between the upper surface 2S and the lower surface 2I forms the contactor 22. Depending on the position of the contactor 22 in the pushbutton, in particular on the lower surface of the pushbutton, the pushbutton 2 possibly includes a spacer 210 for separating the touch-sensitive surface at rest by way of at least one spacer 210.

The spacer 210 is possibly made from flexible material, allowing the contactor 22 to touch the touch-sensitive surface 10 when the pushbutton 10 is under pressure, that is to say when the user U presses in particular at least one of his fingers on the pushbutton 2.

In particular, the contactor 22 is made from flexible conductive material, allowing the contactor 22 to deform under the pressure of a finger of a user, so as to be brought into contact with the touch-sensitive surface 10 when the pushbutton 2 is under pressure.

FIG. 4 illustrates a simplified three-dimensional diagram of a multi-contactor pushbutton according to the invention.

In particular, the pushbutton 2 includes a plurality of contactors 20. Each contactor 20 has a separate position on the upper surface 2S and the lower surface 2I of the pushbutton 2, allowing an interaction with a separate part of the touch-sensitive surface.

FIG. 4 shows a pushbutton 2 including 4 contactors 20, for example for a directional interaction: up, down, right, left, with the terminal connected to the touch-sensitive surface 10.

The pushbutton 2 is formed of a first material 21 from the upper surface 2S to the lower surface 2I. This first material is different from the material forming the four contactors 20.

The composition and the dimensions of the pushbutton are such that the deformation of the pushbutton 2 upon pressure on one of the contactors 22 leads to just one contactor 22 making contact with the touch-sensitive surface 10 present underneath the pushbutton 2: the contactor 22 above which the pressure was exerted on the pushbutton 2.

In particular, the pushbutton includes at least one spacer isolating the contactors from the touch-sensitive surface when the pushbutton is at rest. In particular, the position and/or the material (possibly the first material) forming the spacer is such that the deformation of one or more of the at least one spacers 210 and/or of the first material of the pushbutton 2 allows just one of the four contactors 22 to make contact with the touch-sensitive surface 10.

The advantage of a multi-contactor pushbutton is that of allowing a plurality of separate interactions by positioning a single button: such as interactions with a processing window scrollbar (editing, reading, browsing, etc.), multidirectional interactions for a game for example, etc.

FIGS. 5a and 5b illustrate simplified diagrams of separate embodiments of the fastenings of a pushbutton according to the invention.

In particular, the pushbutton 2 includes fasteners 211 for fastening the pushbutton 2 in a position in relation to the touch-sensitive surface 10.

FIG. 5a shows a pushbutton 2 held in a position in relation to the touch-sensitive surface 10 through suction. The pushbutton 2 includes at least one fastener 211a acting on its own or in combination with other fasteners 211a of the pushbutton 2 in order to create a suction effect between the pushbutton 2 and the touch-sensitive surface 10, allowing the pushbutton placed in a first position in relation to the touch-sensitive surface 10 to maintain this first position regardless of the position of the touch-sensitive surface (horizontal, vertical, at 45°, 30°, etc.) when it is used, as long as the user U does not modify this position of the pushbutton.

The advantage of such fasteners is that they make it possible to position the pushbutton at any position in relation to the touch-sensitive surface, even in the middle thereof, without imposing other constraints on the visibility of the rest of the touch-sensitive surface.

FIG. 5b shows a pushbutton held in a position in relation to the touch-sensitive surface through interaction with a protector of the touch-sensitive surface.

FIG. 5b shows a pushbutton 2 held in a position in relation to the touch-sensitive surface 10 through interaction with a third-party device, such as a protector 4 of the touch-sensitive surface. The pushbutton 2 includes at least one anchor 211b, such as in particular a notch, acting on its own or in combination with other anchors 211b of the pushbutton 2 in order to allow the pushbutton 2 to interact with a protector 4 of the touch-sensitive surface 10, allowing the pushbutton placed in a first position in relation to the touch-sensitive surface 10 to maintain this first position regardless of the position of the touch-sensitive surface (horizontal, vertical, at 45°, 30°, etc.) when it is used, as long as the user U does not modify this position of the pushbutton.

Such anchors making it possible to anchor the pushbutton 2 not directly on the touch-sensitive surface 10 but on a protector 4 of the touch-sensitive surface limit the risks of damage to the touch-sensitive surface (scratches, disconnection of the glass of the screen from the conductive underlayer, etc.).

FIGS. 6a and 6b illustrate simplified diagrams of a physical interface according to the invention.

A physical interface 20 for a touch-sensitive surface includes at least one physical pushbutton 2 for a touch-sensitive surface. The pushbutton 2 is able to allow an interaction with a terminal 1, 3 by way of a touch-sensitive surface 10 when the pushbutton 2 is positioned on the touch-sensitive surface 10.

In particular, the physical interface 20 includes a provider 201 of an identifier of the physical interface IP_id to the terminal 1, 3, such that the identifier of the physical interface IP_id allows the terminal 1, 3 to modify a virtual interface with the terminal 1, 3. The modification depends on the identifier of the physical interface IP_id.

In particular, the identifier provider 201 consists of at least one of the following devices:
a symbol affixed to the physical interface, in particular a barcode, a QR code, a serial number, etc.;
an object placed in or on the physical interface at a position coding the identifier of the physical interface, the position of the object on the physical interface being able to be detected by the terminal (for example, the object is a magnet whose position is able to be detected by the magnetometers of the terminal);
a transmission circuit having a memory containing the identifier of the physical interface, the circuit being a contact-based or contactless transmission circuit, such as an RFID or NFC chip, etc.

In particular, the identifier provider 201 includes a controller (not illustrated). The identifier provider 201 transmits a virtual interface adaptation command adpt_cmd generated by the controller. The adaptation command adpt_cmd triggers the modification of the virtual interface depending on the identifier of the physical interface IP_id contained in the adaptation command adpt_cmd.

In particular, the identifier provider 201 is formed and/or placed underneath a pushbutton 2 that makes it possible to activate the corresponding virtual interface on the touchscreen. For example, the form of the pushbutton and/or its position on the touchscreen and/or an additional identifier provider placed underneath a pushbutton (RFID or NFC chip, QR code, etc.) detected by the touchscreen makes it possible to identify the physical interface and modify the virtual interface accordingly.

The advantage of a physical interface including a plurality of pushbuttons for a touch-sensitive surface is that of its ease of transport and of manipulation in comparison with the touch-sensitive surface, avoiding losses of buttons, positioning errors in relation to the touch-sensitive surface, implementation slowness (for a large number of pushbuttons), etc.

FIG. 6a shows an overall view of an example of a physical interface according to the invention.

The physical interface 20 is in particular provided on a support 200. It is able to be positioned on a touch-sensitive surface 10 so as to allow a user U to interact with a terminal 1, 3 connected to the touch-sensitive surface through pressure on at least one pushbutton 2 of the physical interface 20, which transmits the interaction to the terminal 1, 3 via the touch-sensitive surface 10.

In the example of FIG. 6a, the pushbuttons 2 of the physical interface 20 form an alphanumeric keypad.

FIG. 6b shows a cross-sectional view of part of an exemplary embodiment of a physical interface according to the invention.

The physical interface 20 is formed of a plurality of pushbuttons $2^1$, $2^2$, etc. A pushbutton $2^1$, $2^2$, etc. includes a contactor $22^1$, $22^2$, etc. and is formed of a flexible material $21^1$, $21^2$, etc. allowing the pushbutton to deform when a user U puts it under pressure, such that the deformation leads to the contactor $22^1$ of the pushbutton $2^1$ under pressure making contact CS with the touch-sensitive surface 10 on which the physical interface 20 is positioned.

The contact CD of the user U with the pushbutton $2^1$ is thus transmitted to the touch-sensitive surface 10, as if the user had placed his finger directly on that part of the touch-sensitive surface 10 on which the contactor $22^1$ of the pushbutton $2^1$ is in contact CS.

In particular, the physical interface 20 includes at least one spacer $210^1$, $210^{1+2}$, $210^2$, etc., making it possible to isolate the contactors $22^1$, $22^2$, etc. of the pushbuttons $2^1$, $2^2$, etc. at rest from the touch-sensitive surface 10.

In particular, the physical interface 20 includes an identifier provider 201, in this case equipped with a controller able to transmit, to the terminal 1, 3, a command adpt_cmd to adapt the virtual interface of the terminal, including an identifier of the physical interface IP_id.

FIGS. 7a, 7b and 7c illustrate simplified diagrams of protectors according to the invention.

A protector 200 for a touch-sensitive surface 10, such as a frontal cover, a case (flip case) or a sleeve, covers at least part of a touch-sensitive surface 10 able to allow an interaction with a terminal 1, 3. The frontal part of the protector 200 includes at least one pushbutton 2 for a touch-sensitive surface or a physical interface 20 for a touch-sensitive surface including at least one pushbutton 2 for a touch-sensitive surface. The pushbutton 2 is able to allow an interaction with a terminal 1, 3 by way of a touch-sensitive surface 10 when the pushbutton 2 is positioned on the touch-sensitive surface 10.

FIG. 7a shows an overall view of a protector incorporating a physical interface of keypad type.

The frontal part of the protector 200 is placed in front of the touchscreen 10 of a smartphone or of a touchscreen tablet 1. A window 201 is possibly cut out from the frontal part of the protector 200, allowing a user U to directly access a zone F10 of the touchscreen 10 in order to interact with the terminal 1.

A plurality of pushbuttons 2, which forms a physical interface 20, in this case an alphanumeric keypad, by way of which a user U is able to interact with the terminal 1 by way of the touchscreen 10, are placed in another zone of the frontal part of the protector 200.

The pushbuttons that are implemented are such as described above.

The protector 200 possibly includes a QR code for identifying the physical interface 20, which is able to be read by the terminal 1 so as to adapt the virtual interface displayed by the touchscreen 10 so that the virtual interface displayed by the touchscreen corresponds to the physical interface 20 placed on the touchscreen, in particular so as to display a virtual alphanumeric keypad on which the physical alphanumeric keypad 20 will be placed such that the pressing of a key, for example the "space bar" key, of the physical alphanumeric keypad 20 by a user leads to the pushbutton making contact with that zone of the touchscreen 10 in which the key corresponding to the same interaction, in our example the "space bar" key, of the virtual alphanumeric keypad is displayed, making it possible to trigger this interaction, in this case the inputting of a space, by way of the terminal 1.

FIG. 7b shows an overall view of a protector incorporating a physical gamepad interface.

The frontal part of the protector 200 is placed in front of the touchscreen 10 of a smartphone or of a touchscreen tablet 1. A window 201 is possibly cut out from the frontal part of the protector 200, allowing a user U to directly access a zone F10 of the touchscreen 10 in order to interact with the terminal 1.

A plurality of pushbuttons 2 including, in this case, at least one multi-contactor button $2_M$, which forms a physical interface 20, in this case a gamepad, by way of which a user U is able to interact with the terminal 1 by way of the touchscreen 10, are placed in another zone of the frontal part of the protector 200.

The pushbuttons that are implemented are such as described above.

The protector 200 possibly includes an RFID chip for commanding an adaptation of the virtual interface displayed by the touchscreen 10 of the terminal 1. The RFID chip transmits, to the terminal, in particular an adaptation command including an identifier of the physical interface 20. The terminal 1 then implements an adaptation of the virtual interface displayed by the touchscreen 10 such that the virtual interface displayed by the touchscreen 10 corresponds to the physical interface 20 placed on the touchscreen, in particular so as to display a virtual gamepad on which the physical gamepad 20 will be placed so that the pressing on a button or a zone of a button, for example the top of the multidirectional button $2_M$, of the physical gamepad 20 by a user leads to the pushbutton or the zone of the pushbutton making contact with that zone of the touchscreen 10 in which the button corresponding to the same interaction, in our example the top of the multidirectional key, of the virtual gamepad is displayed, making it possible to trigger this interaction, in this case an upward movement, by way of the terminal 1.

FIG. 7c shows a cross-sectional view of one embodiment of a protector according to the invention.

The protector 200 includes at least a frontal part placed on the touch-sensitive surface 10 for interacting with a terminal 1, 3. When the protector 200 includes only a frontal part, this is in particular a film installed as protector for a touchscreen, for example through static electricity.

The protector 200 may also include a rear part, in particular when the protector is a case. Thus, the physical interface 20 implemented on the frontal part is easily able to be installed on and removed from the touch-sensitive surface.

When the protector 200 is a sleeve, better holding of the physical interface 20 implemented on the frontal part of the protector 200 is ensured.

A window 201 is possibly cut out from the frontal part of the protector 200, making it possible to access the touch-sensitive surface. This window 201 is either a removal of material allowing direct access to the touch-sensitive surface, or a film of material allowing direct touch-based contact with the touch-sensitive surface 10. If the touch-sensitive surface 10 is a screen, this film will be transparent, allowing the user to see the display of the touchscreen 10.

The invention makes provision for the frontal part of the protector 200 to include a physical interface 20 including at least one pushbutton 2 for a touch-sensitive surface thus placed on the touch-sensitive surface 10. The pushbutton 2 allows a user U, in particular by way of a contactor 22, to interact with the terminal 1, 3 by way of the touch-sensitive surface 10. In particular, the pushbutton 2, or even the physical interface 20, is formed of a flexible material the deformation of which, under a pressure, brings the contactor 22 into contact with the touch-sensitive surface 10.

The protector according to the invention thus makes it possible to partly or fully protect the touch-sensitive surface, or even the terminal having a touchscreen, while at the same time facilitating interaction with the terminal.

In particular, the shell of the mobile telephone or smartphone will become a physical interface with this terminal, in particular in its frontal part. This physical interface may comprise, depending on the final use, a set of pushbuttons corresponding to command buttons, input buttons, cursors or keypads.

In particular, at least that part of the physical interface that is intended to be in contact with the touch-sensitive surface during pressure on a button will be made from conductive material.

The physical interface 20 may be in multiple form of alphanumeric keypad, number pad, gamepad or console specific to an application, that is to say including the pushbuttons essential for interacting with a terminal implementing this application, such as a Tweet, SMS, Tchat, etc. application.

While still protecting the touch-sensitive surface 10, or even the terminal 1 equipped with a touchscreen 10, the physical interface 20 improves intuitive use of the smartphone or of the tablet. For example, for gamers, in particular children, the shell 200 makes it possible to bolster protection: resistance to impacts and to water, while at the same time keeping the initial simplicity of the physical interface 20 because it corresponds to commercial gaming consoles.

Another benefit of the invention relates to the ease of holding the physical interface in comparison with a touchscreen, in particular for people having finger mobility that is limited or impacted by hypoesthesia.

FIGS. 8a, 8b, 8c and 8d illustrate simplified diagrams of various exemplary embodiments of a protector according to the invention.

FIG. 8a shows a protector in the form of a protective casing normally placed on the back of the terminal 1 in order to protect it against impacts in the event of being dropped, as shown by the casing 200 in position B. This same casing 200 may be moved my by the user in order to be placed in front of the touchscreen 10 of the terminal 1, as shown by the casing in position A.

The protector 200 then includes an aperture 201 allowing the user to read, view data displayed on the touchscreen 10 while at the same time using either the accessible part of the touchscreen 10 or the physical interface 20 to interact with the terminal 1: in particular in our example in which the physical interface forms a gamepad, move the character in the game in particular by way of the multi-contactor pushbutton $2_M$ and perform actions, in the game, of picking up, striking, using an object, etc. by way of one or more of the pushbuttons 2.

The contactors 22 placed, in our example, in the center of the pushbuttons 2 and at 4 separate points of the multi-contactor button $2_M$ are able to be seen on the casing in position B. Other embodiments of the pushbuttons 2 and $2_M$ may be used for the physical interface of a protective casing 200 according to the invention.

FIG. 8b shows a case, also called flip case, forming a protector 200 for a terminal 1 having a touchscreen 10. FIG. 8b illustrates two separate positions of the case 200: open O and closed F. In its closed position, the case 200 protects the front face of the terminal 1 including the touchscreen 10. In its open position, the case 200 allows a user to access the entire touchscreen in order to display data and/or interact with the terminal directly on the entire touchscreen.

The case 200 consists of a frontal cover 200A and of a rear cover 200B.

The rear cover 200B is fixed. It receives the terminal 1 and holds the terminal 1 on the frontal cover, allowing continuous protection of the terminal 1 in its rear part, in particular in the event of impacts, being dropped, etc.

The frontal cover 200A includes a physical interface 20 according to the invention and/or at least one pushbutton 2, 2M for a touch-sensitive surface according to the invention. This frontal cover 200A is linked to the rear cover 200B so as to form the case 200, making it impossible to lose or forget the frontal cover when it is not positioned in front of the touchscreen 10. The link 200L between the frontal cover 200A and the rear cover 200B may be placed over a width or a common length of the two covers 200A and 200B. In the example of FIG. 8b, the link 200L is formed over the left-hand length of the two covers.

This link 200L facilitates switching from one position to another: open position O and closed position F of the case. FIG. 8b shows the closure cl of the casing 200, which then switches from the open position O to a closed position F. The link 200L may be made of a flexible material present over at least part, or even all, of the length or width serving as link: for example made of leather when the case is covered with this material, of cardboard, of polymer, etc., but also using hinges, etc.

The frontal cover 200A of the casing 200 includes an aperture 201 that allows a window F10 of the touchscreen 10 to be shown. This allows the user to read, view data displayed on the touchscreen 10 while at the same time using either the accessible part of the touchscreen 10 or the physical interface 20 to interact with the terminal 1: in particular in our example in which the physical interface forms a gamepad, move the character in the game in particular by way of the multi-contactor pushbutton $2_M$ and perform actions, in the game, of picking up, striking, using an object, etc. by way of one or more of the pushbuttons 2.

The contactors 22 placed, in our example, in the center of the pushbuttons 2 and at 4 separate points of the multi-contactor button 2M are able to be seen on the frontal cover 200 in position O. Other embodiments of the pushbuttons 2 and $2_M$ may be used for the physical interface of a protective casing 200 according to the invention.

A closure 202 possibly makes it possible to keep the case 200 in the closed position F. This closure 202 is for example at least one magnet that will keep the case on a conductive part of the terminal 1.

One exemplary embodiment that is not illustrated is a protective sleeve corresponding to a sock including two faces of which one of its faces: the frontal face has a physical interface or at least one pushbutton according to the invention. With such a protective sleeve, the problem of keeping the physical interface on the touch-sensitive surface no longer arises since the touch-sensitive surface 10, or even the terminal 1 when it includes the touchscreen 10, is slid directly into the protective sleeve 200 which, due to its design, keeps the physical interface on the touch-sensitive surface 10 when the touch-sensitive surface is slid into the sleeve so that its frontal face is positioned on the touch-sensitive surface 10. When the user chooses to no longer interact by way of the touch-sensitive surface, the position of the touch-sensitive surface in the sleeve may be modified so that the frontal face is placed at the back of the touch-sensitive surface, or even of the terminal.

FIG. 8c shows a protector 200 formed of a double casing: a rear casing 200B in which the terminal 1 is housed, protecting the terminal 1 in the event of impacts, being dropped, etc., and a frontal casing 200A including at least one pushbutton 2, $2_M$ for a touch-sensitive surface or a physical interface 20 according to the invention.

The frontal casing 200A may be placed in front of the touchscreen 10 of the terminal 1 and interacts with the rear casing 200B so as to enclose the terminal 1 in the protector 200 formed by the assembly of the two casings 200A and 200B. This interaction makes it possible to keep the frontal casing 200A on the touchscreen 10.

To allow access to the display of the screen 10 of the terminal 1, either the frontal casing 200A includes an aperture 201 (as illustrated in the previous embodiments), or this is formed of a transparent or translucent material as illustrated in FIG. 8c. The protector 200 thus completely covers the terminal 1 making it possible, depending on the means of interaction between the two casings, to protect not only the terminal but also the screen against being dropped and impacts, and against damage linked in particular to dust, to sand, against liquids, etc. For example, the link (not illustrated) between the two casings 200A and 200B includes a seal allowing sealtightness. The link may also be formed by stacking the two casings 200A and 200B one inside the other (the dimensions and/or the materials of the stacking parts of the two casings being such that opening the protector 200 requires a given action: pressing or a predetermined gesture on at least one of the two casings 200A, 200B).

FIG. 8d shows a surround 200 formed of two parts: a rear part 200B in which the terminal 1 is housed, protecting the terminal 1 in the event of impacts, being dropped, etc., and a frontal part 200A including at least one pushbutton 2, $2_M$ for a touch-sensitive surface or a physical interface 20 according to the invention, the two parts 200A and 200B being articulated with respect one another.

FIG. 8d illustrates two separate positions of the surround 200: open O and closed F. In its closed position, the surround 200 protects the entire terminal 1 including its front face including the touchscreen 10. In its open position, the surround 200 allows a user to access the entire touchscreen in order to display data and/or interact with the terminal directly on the entire touchscreen.

The frontal part 200A may be placed in front of the touchscreen 10 of the terminal 1 and interacts with the rear part 200B so as to enclose the terminal 1 in the protector 200 formed by the assembly of the two casings 200A and 200B. This interaction makes it possible to keep the frontal part 200A on the touchscreen 10. To ensure that the frontal part 200A is held in front of the screen, the surround 200 includes a closure 202. In the example of FIG. 8d, the closure 202 is articulated. Thus, the user modifies the position of the closure 202 depending on whether or not he desires to keep the surround 200 in the closed position F or not. Locking lck the closure 202 when the surround 200 is in the closed position F makes it possible to guarantee holding in this position. Holding of the interface 20 on the touch-sensitive surface 10 is thus guaranteed.

To allow access to the display of the screen 10 of the terminal 1, either the frontal part 200A includes an aperture 201 (as illustrated in the previous embodiments), or this is formed of a transparent or translucent material as illustrated in FIG. 8c. The surround 200 thus completely covers the terminal 1, making it possible, depending on the means of interaction between the two parts, to protect the terminal 1, and in particular the touchscreen 10, against dust, sand, or even to provide sealtightness (protection against liquid), etc. For example, the link between the two parts 200A and 200B includes a seal allowing sealtightness. The link 200L may also be formed by stacking the two parts 200A and 200B one inside the other (the dimensions and/or the materials of the stacking parts of the two parts being such that opening the protector 200 requires a given action: pressing or a predetermined gesture on at least one of the two casings 200A, 200B). The closure 202 then also makes it possible to guarantee that the terminal 1 and the touchscreen 10 are protected not only against impacts, being dropped, etc., but also against damage linked for example to particles: dust, sand, to liquids, etc. The surround 200 is then sealtight.

FIG. 9 illustrates a simplified diagram of a virtual interface method according to the invention.

The virtual interface method PIV for a terminal includes capturing an interaction I_CPT with the terminal by way of a pushbutton 2 for a touch-sensitive surface 10 by way of a touch-sensitive surface when the pushbutton is positioned on the touch-sensitive surface.

In particular, the virtual interface method PIV includes modifying the virtual interface IV_MDF depending on an identifier of a physical interface IP_id for a touch-sensitive surface, the physical interface including at least one pushbutton for a touch-sensitive surface and a provider of the identifier of the physical interface to the terminal.

One particular embodiment of the virtual interface method is a program comprising program code instructions for executing the steps of the virtual interface method when said program is executed by a processor.

The software applications of a smartphone may thus possibly adapt to the physical interface according to the invention, in particular when it is implemented on a shell protecting the smartphone, and will allow the exchanges between the physical interface of the shell and the terminal via the touchscreen.

Nowadays, a terminal 1 in a standby mode may allow a limited number of interactions via the touch-sensitive surface. This standby mode is then called a light standby mode. At present, the light standby mode makes it possible to provide a notification about a new received message and to open this new received message (possibly on the condition that it is a short message: SMS, MMS, Tweet, etc. or the start of a longer message: email, etc.), to accept a call, etc., but not to access all of the functions of the terminal 1.

In one particular embodiment, the virtual interface of a light standby mode will make it possible, when a physical interface according to the invention is positioned on the touch-sensitive surface, not only to read a new received message, but also to respond thereto, in particular when the physical interface is an alphanumeric keypad (the response will possibly be limited to a short message: SMS, MMS, Tweet or the size of a short message: email having a maximum number of characters, etc.). The limit is linked in particular to the window F10 for displaying the message without use of a scrollbar.

FIG. 10 illustrates a diagram of a terminal according to the invention.

A terminal 1 includes a virtual interface 11 able to capture an interaction with the terminal 1 by way of a pushbutton 2 for a touch-sensitive surface by way of a touch-sensitive surface 10 when the pushbutton 2 is positioned on the touch-sensitive surface 10.

FIG. 10 shows the physical interface 20 including at least one pushbutton 2 for a touch-sensitive surface, and a terminal 1 displaying the visible part of a virtual interface 11 on a touchscreen 10. When the physical interface 20 is placed on the touchscreen 10, a physical pushbutton 2 will correspond to a key displayed by the virtual interface 11 on the touchscreen 10. Thus, when a user presses the physical pushbutton 2, the contact established by the pushbutton 2 with the touchscreen 10 on the key displayed by the virtual interface triggers an interaction with the terminal 1 corresponding to the interaction associated with the displayed key, without the user having directly touched this virtual key.

In order that the user does not have to choose his physical interface or to position one or more physical pushbuttons depending on a display of a virtual interface on the touchscreen, the physical interface 20 provides the terminal 1 with its identifier IP_id, thus making it possible to adapt the virtual interface to the physical interface placed on the touch-sensitive surface 10.

This adaptation may prove cumbersome when the adaptation requires just one or a limited number of pushbuttons and/or a single multi-contactor button.

The invention also targets a medium. The information medium may be any entity or device capable of storing the program. For example, the medium may include a storage means, such as a ROM, for example a CD-ROM or a microelectronic circuit ROM, or else a magnetic recording means, for example a floppy disk or a hard disk.

Moreover, the information medium may be a transmissible medium such as an electrical or optical signal, which may be routed via an electrical or optical cable, by radio or by other means. The program according to the invention may in particular be downloaded from a network, in particular from the Internet.

As an alternative, the information medium may be an integrated circuit in which the program is incorporated, the circuit being designed to execute or to be used in the execution of the method in question.

In another implementation, the invention is implemented by way of software and/or hardware components. With this in mind, the term "module" may correspond equally to a software component or to a hardware component. A software component corresponds to one or more computer programs, one or more subroutines of a program or, more generally, to any element of a program or of software that is able to implement a function or a set of functions in accordance with the above description. A hardware component corresponds to any element of a hardware assembly that is able to implement a function or a set of functions.

Although the present disclosure has been described with reference to one or more examples, workers skilled in the art will recognize that changes may be made in form and detail without departing from the scope of the disclosure and/or the appended claims.

The invention claimed is:

1. A protector for covering at least part of a touch-sensitive surface able to allow an interaction with a terminal, the protector comprising:
 a frontal part including:
  a physical interface for the touch-sensitive surface including at least one pushbutton for the touch-sensitive surface, the at least one pushbutton including:
a contactor passing through the pushbutton from an upper surface of the pushbutton to a lower surface of the pushbutton, the contactor being configured to allow an interaction with the terminal by way of the touch-sensitive surface when the pushbutton is positioned on the touch-sensitive surface, wherein:
the upper surface allows a finger of a user to exert pressure on the pushbutton, and the lower surface is positioned above the touch-sensitive surface and is configured to be brought into contact with the touch-sensitive surface when pressure is exerted on the pushbutton, and
the contactor is positioned:
on the upper surface so as to be in contact with the finger of the user exerting a pressure on the upper surface of the pushbutton, and
on the lower surface so as to be in contact with the touch-sensitive surface when the lower surface is brought into contact with the touch-sensitive surface; and
a provider of an identifier of the pushbutton, which is readable by the terminal, wherein the provider of the identifier of the pushbutton enables the terminal to modify a virtual interface with the terminal, the modification depending on the identifier of the pushbutton,
and wherein the frontal part of the protector is movable between:
a closed position where the physical interface for the touch-sensitive surface is in contact with the touch-sensitive surface of the terminal, the closed position triggering the modification of the virtual interface of the terminal according to the identifier; and
an open position where the physical interface for the touch-sensitive surface is not in contact with the touch-sensitive surface of the terminal and where the virtual interface of the terminal is not modified.

2. The protector as claimed in claim 1, wherein the pushbutton includes a plurality of contactors, each contactor having a separate position on the upper surface and the lower surface of the pushbutton, allowing an interaction with a separate part of the touch-sensitive surface.

3. The protector as claimed in claim 1, wherein the pushbutton includes fasteners for fastening the pushbutton in a position in relation to the touch-sensitive surface.

4. The protector as claimed in claim 1, wherein the pushbutton is formed of at least one flexible material.

5. The protector as claimed in claim 1, wherein the contactor is formed of at least one conductive material.

6. The protector as claimed in claim 1, wherein the provider of the identifier consists of at least one of the following devices:
a symbol affixed to the physical interface;
a transmission circuit having a memory containing the identifier of the physical interface, the circuit being a contact-based or contactless transmission circuit.

7. The protector as claimed in claim 1, wherein the provider of the identifier includes a controller, the provider of the identifier transmitting a virtual interface adaptation command generated by the controller, the adaptation command triggering the modification of the virtual interface depending on the identifier of the physical interface contained in the adaptation command.

8. A virtual interface method for a terminal comprising a touch-sensitive surface able to allow an interaction with the terminal, the method including:
covering at least part of the touch-sensitive surface with a protector comprising:
a frontal part including:
a physical interface for the touch-sensitive surface including at least one pushbutton for the touch-sensitive surface,
the at least one pushbutton including:
a contactor passing through the pushbutton from an upper surface of the pushbutton to a lower surface of the pushbutton, the contactor being configured to allow an interaction with the terminal by way of the touch-sensitive surface when the pushbutton is positioned on the touch-sensitive surface, wherein:
the upper surface allows a finger of a user to exert pressure on the pushbutton, and the lower surface is positioned above the touch-sensitive surface and is configured to be brought into contact with the touch-sensitive surface when pressure is exerted on the pushbutton, and
the contactor is positioned:
on the upper surface so as to be in contact with the finger of the user exerting a pressure on the upper surface of the pushbutton, and
on the lower surface so as to be in contact with the touch-sensitive surface when the lower surface is brought into contact with the touch-sensitive surface; and
a provider of an identifier of the pushbutton, which is readable by the terminal, wherein the provider of the identifier of the pushbutton enables the terminal to modify a virtual interface with the terminal, the modification depending on the identifier of the pushbutton,
and wherein the frontal part of the protector is movable between:
a closed position where the physical interface for the touch-sensitive surface is in contact with the touch-sensitive surface of the terminal, the closed position triggering the modification of the virtual interface of the terminal according to the identifier; and
an open position where the physical interface for the touch-sensitive surface is not in contact with the touch-sensitive surface of the terminal and where the virtual interface of the terminal is not modified
the terminal reading the identifier of the physical pushbutton and modifying the virtual interface with the terminal in response to the frontal part of the protector being positioned in the closed position and depending on the identifier of the physical pushbutton; and
capturing an interaction with the terminal, by way of the contactor passing through the pushbutton from the upper surface of the pushbutton to the lower surface of the pushbutton, by way of the touch-sensitive surface.

* * * * *